Sept. 4, 1951 — R. C. ZEIDLER — 2,566,394
CLUTCH PLATE
Filed June 22, 1948
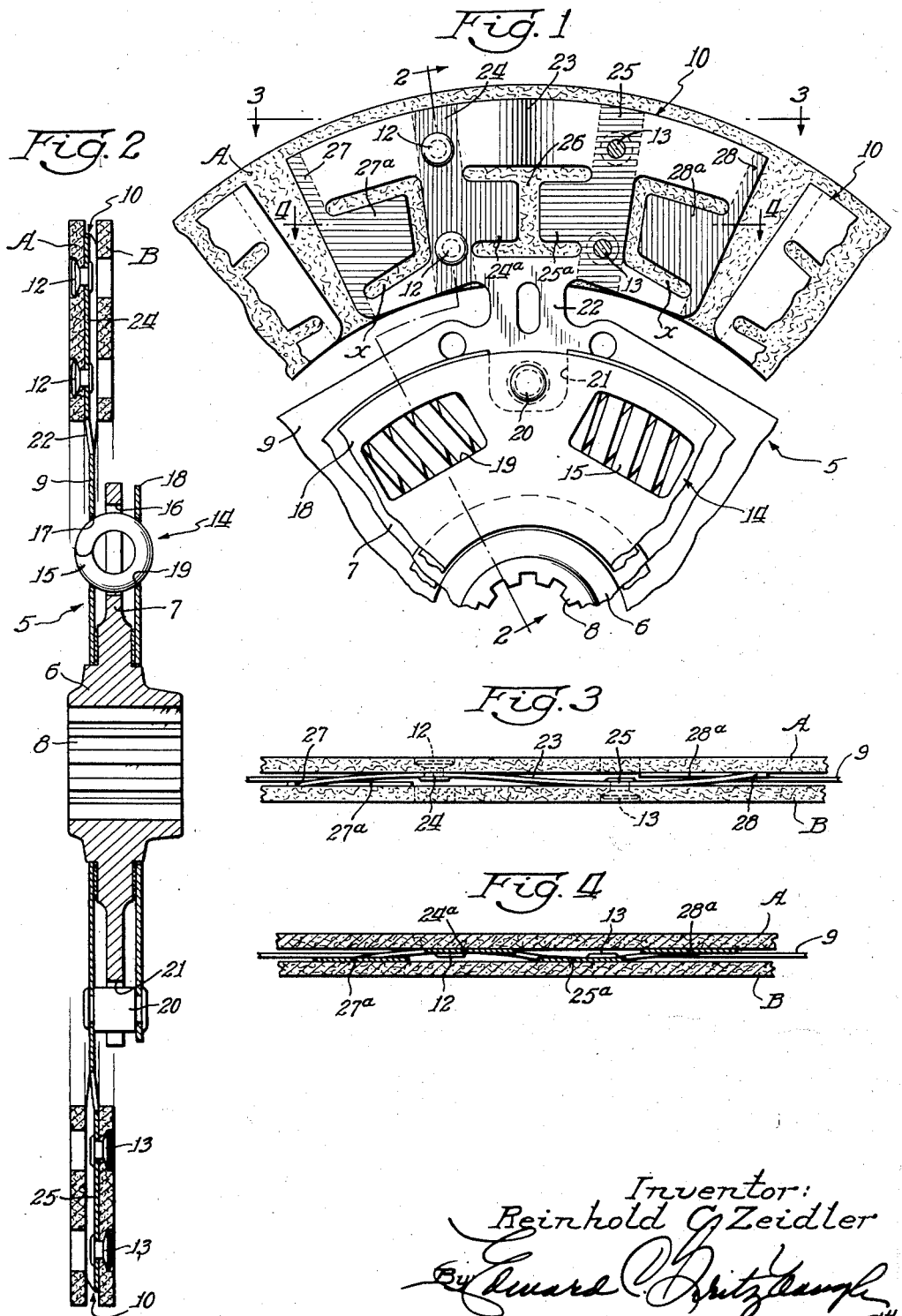
Inventor:
Reinhold G. Zeidler
By Edward C. Fritzhaugh
Atty.

Patented Sept. 4, 1951

2,566,394

UNITED STATES PATENT OFFICE 2,566,394

CLUTCH PLATE

Reinhold C. Zeidler, Detroit, Mich., assignor to Borg-Warner Corporation, Chicago, Ill., a corporation of Illinois Application June 22, 1948, Serial No. 34,438

5 Claims. (Cl. 192—107)

1

The present invention relates to friction clutch driven plates, and has to do particularly with the construction and arrangement of a central disc therefor which has spoke-like cushions for supporting the axially spaced friction facing members.

It is one of the principal objects of this invention to simplify the construction of the friction facing mounting member of a clutch plate such as contemplated herein, and to improve the efficiency and operation of the friction driven plate assembly.

Another object hereof is to provide a friction clutch driven plate wherein the initial supporting area for the friction facings is considerably greater than is usually afforded by the cushions of the type generally employed in clutch driven plates.

Still another object of this invention resides in the provision of a clutch plate wherein the friction facing mounting disc has a plurality of spokelike cushions, preferably formed integral therewith, and each cushion being symmetrical on both sides of the radial center line of the respective spoke whereby the initial supporting area for one friction facing is equal to the supporting area for the other friction facing.

It is a further object hereof to provide a friction clutch disc member having a cushion rim portion lying between the friction facings and is constructed and arranged so that the cushions provide greater initial supporting area for each facing, with the result that the so-called "wear pattern" on the facings is considerably improved. In this connection, tests and experimentation disclose that those portions of the facing which initially are least supported show very little "wear pattern," which is probably due to the fact that these areas have, during operation of the clutch, performed only a minimum amount of work up to the time when such areas, under high unit pressure, have been reduced in thickness by wear and the like. In the present instance each cushion has been improved by materially increasing the initial supporting areas thereof which lie in contact against the facings. Hence, there is greater efficiency in the clutch driven plate and more uniform wear of the facings is obtained because of the increased initial area or areas of contact between the facings and the cushions which support them.

It is also an object of the present invention to provide the sheet metal cushions of a friction clutch plate with a plurality of radial lands that are alternately offset to the plane of the disc, and each land has a lateral or circumferentially extending tongue which is of considerable superficial area and same plane as its respective land so as to increase the initial support for each friction facing at the regions of the lands. In this arrangement there are radial lands at the central or intermediate region of each cushion, such lands having greater dimensions measured transversely than the marginal end lands, such central lands being adapted to receive the rivets which secure both facings to each cushion.

Additional objects and advantages of the improvements contemplated herein will be apparent to persons skilled in the art after the construction and operation of the clutch plate assembly is understood from the within description.

It is preferred to accomplish the numerous objects of this invention and to practice the same in substantially the manner hereinafter fully described and as more particularly pointed out in the appended claims. Reference is now made to the accompanying drawings forming a part of this specification.

In the drawings:

Fig. 1 is a fragmentary elevation of a portion of a driven clutch plate which embodies the features of the present invention, the adjacent friction facing being omitted for clarity;

Fig. 2 is an axial section taken along the plane of line 2—2 on Fig. 1;

Fig. 3 is an outer edge view of the arrangement shown in Fig. 1 as viewed along the plane of line 3—3 on Fig. 1; and Fig. 4 is a sectional view taken along the plane of line 4—4 on Fig. 1.

The drawings are to be understood as being more or less of a diagrammatic character for the purpose of disclosing a typical or preferred form of the invention contemplated herein, and in these drawings like reference characters identify the same parts in the different views.

In the embodiment of the invention shown in Figs. 1 to 4 inclusive, and referring first to Fig. 2, the clutch driven member identified as 5 comprises a hub 6 having a radial flange 7 extending outwardly therefrom and being splined at 8 for mounting the clutch plate on a driven shaft, not shown. At one side of the hub flange 7 there is a sheet metal disc 9 which extends outwardly from the body of the hub to beyond the flange 7 thereof, and its outer region is suitably slotted to provide a plurality of wavy cushions, identified generally as 10, which are arranged in spaced annular array between a pair of axially spaced friction facing members A and B to which each cushion is secured by rivets 12 and 13.

There is a vibration dampener assembly 14 associated with the disc 9 and hub flange 7 for providing a flexible or yieldable driving connection between the disc and the hub. This vibration dampener assembly 14 comprises an annular row of coiled springs 15 seated in openings 16 of the hub flange and openings 17 in the body of disc 9. At the side of the hub flange opposite the disc 9 there is a sheet metal washer 18 which has therein a plurality of openings 19 registering with the hub flange openings 16 and the disc openings 17 to receive the coiled springs 15. The disc 9 and washer 18 are connected together by a plurality of spacer rivets 20, the barrels of which are passed through recesses or notches 21 in the periphery of the hub flange 7, thus serving to maintain the disc and washer in spaced parallel relationship to each other. It is apparent that the recesses or notches 21 are of greater circumferential dimensions than the diameters of the rivet barrels 20 for the purpose of permitting relative rotative movement between the hub flange and the disc-washer assembly 9—18. Also, it will be seen that the openings 17 and 19, respectively, in the disc and washer have radial dimensions which are less than the diameters of the coiled springs 15 so that these springs will be maintained in proper relationship to the other portions of the vibration dampener and will be maintained against dislodgement due to centrifugal forces.

As hereinbefore mentioned, the disc 9 has its outer region slotted in a manner to provide a plurality of annularly arranged wavy cushions 10 lying between and secured to the friction facings A and B. As seen in Fig. 1, each cushion is an approximately T-shaped symmetrical spoke, that may preferably be formed integrally with the disc 9 and having a compound curved or wavy formation as clearly shown in the edge view, Fig. 3. The stem of the T-shaped spoke comprises a narrow neck 22 which is midway between the wings defined by the cross-member of the T-shape. The central region of the cushion, which extends radially outward from the neck between the rivets 12 and 13 defines the cantilever portion 23 of the cushion and is of a reverse or ogee curve in cross-section as shown in Figs. 3 and 4.

Adjoining each side of the cushion central region 23 there are flat radially extending lands 24 and 25 which occupy the regions through which the respective rivets 12 and 13 pass. The radial side edges of each land 24 and 25 are parallel to each other to engage flat against the respective facings, and since these lands are at the margins of the curved central region 23, they are in planes offset to each other and also are on opposite sides of the plane of the disc 9.

There is an opening 26 in the central region 23 of the cushion, and flat tongues 24a and 25a project laterally or circumferentially into said opening from the respective lands 24 and 25. The tongue 24a is flat and in the same plane with its land 24, and similarly, the tongue 25a is in the same plane with its land 25. Thus both lands and their respective tongues are in flat supporting contact with the adjacent facing.

At the end margins of the cushion there are radially extending lands 27 and 28 and each of these lands has a tongue 27a and 28a, respectively, projecting into openings x in the adjacent regions of the cushions which lie circumferentially beyond the central or facing attaching lands 24 and 25. The land 27 and its tongue 27a are offset axially with respect to the land 28 and tongue 28a at the opposite marginal edge of the cushion, so that these two sets of lands and tongues each have flat surface contact with an adjacent friction facing to provide additional supporting areas for said facings.

By reason of the waved formation of the cushion, the marginal land 27 and its tongue 27a are in the same plane with the central region land 25 and tongue 25a and engage the adjacent facing B; and similarly the other marginal land 28 and tongue 28a are in the same plane with the central region land 24 and tongue 24a to engage flat against the other facing A. Differently stated, the sets of lands and tongues, in circumferential order, are alternately offset to the plane of the disc 9.

From the foregoing, it is apparent that each facing has initial supporting contact with a substantial portion of the superficial area of each cushion and since these initial supporting areas are of substantial dimensions the "wear pattern" of the facings have been materially increased in area so that the wear on the facings will be approximately uniform from the start of use of the clutch driven plate. This is an important factor in that the facings are kept at a uniform thickness especially during the initial use of the clutch plate, and it avoids a progressively increasing "wear pattern" which results in facings of unequal thickness after a relatively short period of use.

While this invention has been described herein in its preferred form or embodiment, it will be apparent to persons skilled in the art, and understanding the improvements, that various changes and modifications may be made without departing from the spirit or scope thereof. It is intended in the appended claims to cover all such changes and modifications.

What is claimed is:

1. In a clutch driven plate having a hub, and axially spaced friction facings arranged outward therefrom; facing mounting means comprising a sheet metal disc carried by said hub and extending radially outward therefrom; a plurality of circumferentially spaced spoke-like cushions extending radially outward from said disc and lying between said facings, each cushion having first radially spaced inner and outer circumferential regions in its central portion and arranged oblique to the plane of said disc; first radial lands arranged one each side of and connecting said central circumferential regions, and said first radial lands lying in axially offset planes with respect to each other and to the plane of said disc for contact with the respective facings; circumferentially extending first tongues projecting toward each other and lying in the planes of the respective first radial lands and lying in the space between said first inner and outer circumferential central regions of the cushion; radial marginal lands at the ends of said cushion arranged in axially spaced planes with respect to each other and to the plane of the disc for contact with the respective facings; second radially spaced inner and outer circumferential regions between each radial marginal land and an adjacent first radial land and arranged oblique to the plane of said disc; circumferentially extending second tongues projecting toward each other from the respective marginal lands and lying in the spaces between said second inner and outer oblique regions and also in the planes of the respective marginal end lands; and means attaching said facings to the cushions at the respective first radial lands, said first radial lands and said marginal lands with the irrespective adjoining tongues being alternately disposed axially with relation to the plane of the disc, the said lands on either side of the disc being in plane with each other to support their respective friction facings, and the adjoining tongues providing supplementary areas effecting substantial additional support for said facings.

2. A clutch driven plate as defined in claim 1 wherein the cushions are of generally T-shape and the first and second tongues of said plurality of cushions define an annular row in circumferentially spaced order approximately midway between the inner and outer peripheral edges of said cushions.

3. In a clutch driven plate having a hub, and axially spaced friction facings arranged outward therefrom; facing mounting means comprising a sheet metal disc carried by said hub and extending radially outward therefrom; a plurality of circumferentially spaced generally T-shaped cushions extending radially outward from said disc and lying between said facings, each cushion comprising an outer annular row of circumferentially spaced regions arranged oblique to the plane of said disc; an inner annular row of circumferentially spaced regions; a plurality of radial lands extending from the inner margin to the outer margin of the cushion and connecting said rows of oblique circumferential regions, alternate lands lying in axially offset planes with respect to each other for contact with the respective facings; a plurality of circumferentially extending tongues projecting from said lands into the spaces between said inner and outer oblique circumferential regions; said tongues each lying in the plane of the adjacent land and in contact with a facing, said lands and their respective tongues defining a plurality of flat surfaces for providing initial support of considerable superficial area for each facing; and means attaching said facings to certain of the aforesaid flat surfaces.

4. A clutch driven plate as defined in claim 3 wherein each land and its associated tongue define a flat surface of generally T-shape with the stem of the T pointing in the direction of the center of the cushion measured circumferentially.

5. A clutch driven plate as defined in claim 3 wherein the facing attaching means are engaged with the radial lands which are closest to the centers of the cushions.

REINHOLD C. ZEIDLER.

REFERENCES CITED

The following references are of record in the file of this patent:

UNITED STATES PATENTS

| Number | Name | Date |
| --- | --- | --- |
| 1,956,828 | Fink | May 1, 1934 |
| 2,078,276 | Reed | Apr. 27, 1937 |
| 2,085,167 | Nutt | June 29, 1937 |
| 2,107,741 | Reed | Feb. 8, 1938 |
| 2,283,112 | Wemp | May 12, 1942 |

FOREIGN PATENTS

| Number | Country | Date |
| --- | --- | --- |
| 794,147 | France | Feb. 8, 1936 |